United States Patent
Hu

(10) Patent No.: US 7,990,124 B2
(45) Date of Patent: Aug. 2, 2011

(54) POWER SUPPLY CIRCUIT

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 508 days.

(21) Appl. No.: 12/264,267

(22) Filed: Nov. 4, 2008

(65) Prior Publication Data

US 2010/0097046 A1 Apr. 22, 2010

(30) Foreign Application Priority Data

Oct. 16, 2008 (CN) .......................... 2008 1 0304945

(51) Int. Cl.
*G05F 1/40* (2006.01)
(52) U.S. Cl. .......................... 323/283; 363/95; 713/300
(58) Field of Classification Search .......... 323/282–290, 323/272–275, 268, 310; 363/16–17, 25, 363/89, 95, 41; 713/300, 310, 320
See application file for complete search history.

(56) References Cited

U.S. PATENT DOCUMENTS

| | | | |
|---|---|---|---|
| 6,891,764 B2* | 5/2005 | Li | 365/189.15 |
| 7,426,123 B2* | 9/2008 | Leung et al. | 363/41 |
| 7,640,455 B2* | 12/2009 | Leung et al. | 714/24 |
| 7,710,089 B2* | 5/2010 | Kohout et al. | 323/273 |
| 2009/0179625 A1* | 7/2009 | Liu | 323/285 |
| 2009/0180303 A1* | 7/2009 | Liu | 363/21.14 |

* cited by examiner

*Primary Examiner* — Rajnikant B Patel
(74) *Attorney, Agent, or Firm* — Zhigang Ma

(57) ABSTRACT

A power supply circuit for a motherboard includes a VRM, a first NMOS transistor, a second NMOS transistor, a first capacitor, a first induction coil, and a delay circuit. A gate of the first NMOS transistor is connected to a UGATE pin of the VRM. A source of the first NMOS transistor is connected to a BOOT pin of the VRM via the first capacitor and a PHASE pin of the VRM, and connected to an MCH on the motherboard via the first induction coil. A drain of the first NMOS transistor is connected to a system power. A gate of the second NMOS transistor is connected to an LGATE pin of the VRM. A source of the second NMOS transistor is grounded. A drain of the second NMOS transistor is connected to the source of the first NMOS transistor and the delay circuit.

12 Claims, 2 Drawing Sheets

POWER SUPPLY CIRCUIT

BACKGROUND

1. Technical Field

The present disclosure relates to power supply circuits and, particularly, to a power supply circuit for a motherboard in a computer.

2. Description of the Related Art

Motherboards are the most important parts in computers. Power supply circuits provide working voltages for electronic components on the motherboards, and are necessary, especially for a memory controller hub (MCH). The MCH, also known as a north bridge, is configured to connect to a central processing unit (CPU), an accelerated graphics port (AGP) bus, and a memory. However, a voltage about 1.25V provided by a conventional power supply circuit to the MCH may be not stable due to influence by interferential signals, which may lead to computer malfunctions.

DETAILED DESCRIPTION

Figure 1:
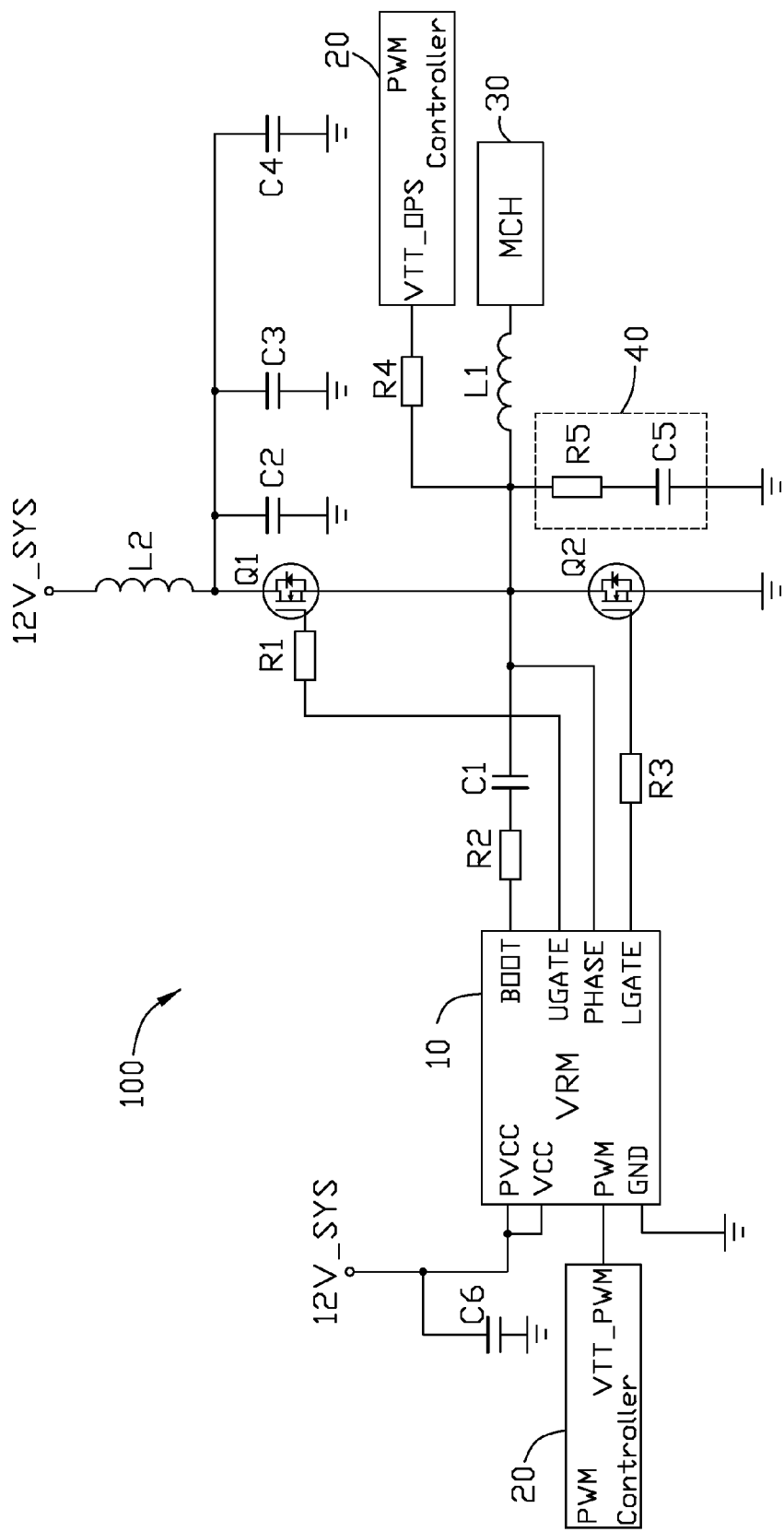
FIG. 1 is a circuit diagram of an exemplary embodiment of a power supply circuit for a motherboard.

Referring to FIG. 1, an exemplary embodiment of a power supply circuit 100 is configured to supply power to a memory controller hub (MCH) 30 on a motherboard. The power supply circuit 100 includes a first N type metal oxide semiconductor (NMOS) transistor Q1 and a second NMOS transistor Q2, two induction coils L1 and L2, four resistors R1-R4, five capacitors C1-C4 and C6, a voltage regulator module (VRM) 10, a resistor-capacitor (RC) delay circuit 40, and a pulse width modulation (PWM) controller 20. The PWM controller 20 is configured for providing a PWM signal for the VRM 10. The VRM 10 is configured for controlling the first NMOS transistor Q1 and the second NMOS transistor Q2 to be turned on according the PWM signal.

A gate of the NMOS transistor Q1 is connected to an upper gate drive output (UGATE) pin of the VRM 10 via the resistor R1. A source of the NMOS transistor Q1 is connected to a PHASE pin of the VRM 10, and connected to the MCH 30 via the induction coil L1. The source of the NMOS transistor Q1 is also connected to a BOOT pin of the VRM 10 via the capacitor C1 and the resistor R2 in series. The capacitor C1 is capable of storing power for the BOOT pin of the VRM 10. The BOOT pin is associated with the UGATE pin of the VRM to drive the first NMOS transistor Q1. The drain of the NMOS transistor Q1 is arranged to receive a 12V system power 12V_SYS via the induction coil L2, and also grounded via the capacitors C2, C3, and C4 in parallel. The induction coil L2 and the capacitors C2, C3, and C4 are configured for wave filtering and reducing influence of interferential signals.

A gate of the NMOS transistor Q2 is connected to a lower gate drive output (LGATE) pin of the VRM 10 via the resistor R3. A source of the NMOS transistor Q2 is grounded. A drain of the NMOS transistor Q2 is connected to the source of the NMOS transistor Q. The drain of the NMOS transistor Q2 is also connected to an external buffer PWM current protection signal (VTT_OPS) pin of the PWM controller 20 via the resistor R4. The VTT_OPS pin of the PWM controller 20 is configured for over current protection. The drain of the NMOS transistor Q2 is also connected to the RC delay circuit 40. The RC delay circuit 40 includes a resistor R5 and a capacitor C5. The resistance of the resistor R5 ranges from about 2.09 ohms to 2.31 ohms. The capacitance of the capacitor C5 is about 1 nF. A first end of the resistor R5 is connected to the drain of the NMOS transistor Q2. A second end of the resistor R5 is grounded via the capacitor C5.

A PVCC pin and a VCC pin of the VRM 10 are both arranged to receive the system power 12V_SYS, and also grounded via the capacitor C6. The PWM pin of the VRM 10 is connected to an external buffer PWM control output signal (VTT_PWM) pin of the PWM controller 20. A GND pin of the VRM 10 is grounded.

At a stage after the VRM 10 is initially powered, voltages at the VCC and PVCC pins of the VRM 10 are lower than 12V and voltages at the UGATE and the LGATE pins are both at a low voltage level. The NMOS transistors Q1 and Q2 are both turned off. 100-500 ms later, the voltages at the VCC and PVCC pins of the VRM 10 reach 12V. The PWM pin of the VRM 10 receives the PWM signal output from the VTT_PWM pin of the PWM controller 20. When the PWM signal is at a high voltage level, the UGATE pin of the VRM 10 outputs a high voltage level signal to turn on the first NMOS transistor Q1, and the LGATE pin of the VRM 10 outputs a low voltage level signal to keep the second NMOS transistor Q2 off. When the PWM signal is at a low voltage level, the LGATE pin of the VRM 10 outputs a high voltage level signal to turn on the second NMOS transistor Q2, and the UGATE pin of the VRM 10 outputs a low voltage level signal to turn off the first NMOS transistor Q1. Such that, the VRM 10 controls the first and second NMOS transistors Q1, Q2 to turn on in alternating manner, and thereby the PHASE pin of the VRM 10 is regulated to output a 1.25V voltage signal. The 1.25V voltage signal is provided to the MCH 30 via the RC delay circuit 40 and the induction coil L1. The RC delay circuit 40 delays the 1.25 voltage signal to make the 1.25 voltage signal sufficient stable. The induction coil L1 is configured for current shunting and wave filtering.

In the present exemplary embodiment, the first and second NMOS transistors Q1 and Q2, functioning as switches, are turned on in alternating manner controlled by the VRM 10, thereby to make the PHASE pin of the VRM 10 output the 1.25V voltage signal for the MCH 30. The first and second NMOS transistors Q1 and Q2 can also be replaced by other switches correspondingly, such as NPN transistors, PNP transistors and the like. Furthermore, the RC delay circuit 40 can be replaced by other kinds of a delay circuit, such as an induction-capacitor (LC) delay circuit.

Figure 2:
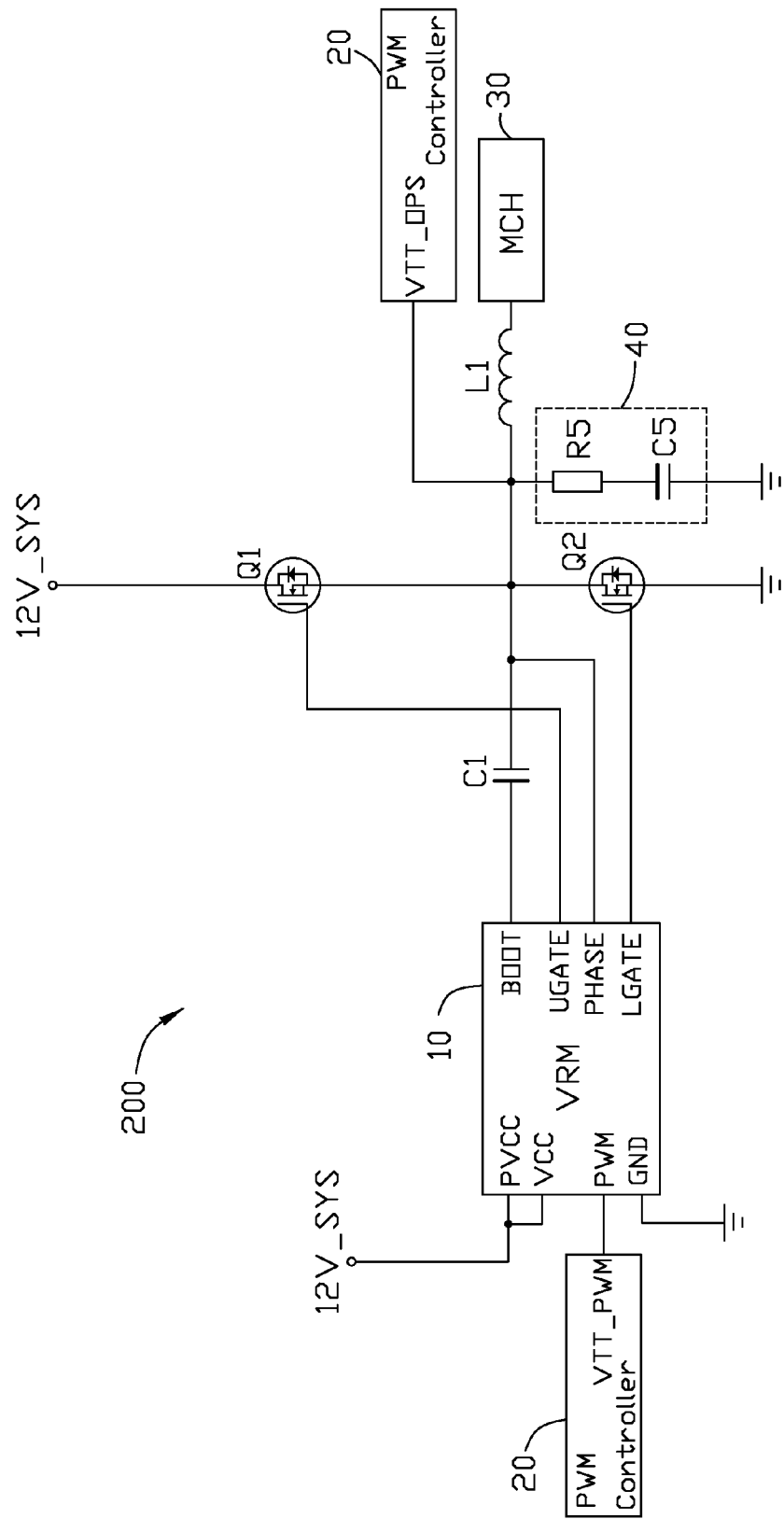
FIG. 2 is a circuit diagram of another exemplary embodiment of a power supply circuit for a motherboard.

Referring to FIG. 2, the capacitors C2, C3, C4, C6, and the resistors R1~R4 of the power supply circuit 200 can be canceled to form a power supply circuit 200 for reducing manufacture cost, in accordance with another embodiment.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A power supply circuit, comprising:
   a voltage regulator module (VRM) comprising a BOOT pin, an upper gate drive output (UGATE) pin, a lower gate drive output (LGATE) pin, and a PHASE pin;
   a pulse width modulation (PWM) controller capable of providing a PWM signal;

a first capacitor capable of storing power;
a first induction coil capable of shunting current and filtering wave;
a delay circuit;
a first transistor, comprising:
- a first terminal connected to the UGATE pin of the VRM to receive a first control signal from the UGATE pin of the VRM;
- a second terminal connected to the BOOT pin of the VRM via the first capacitor and the PHASE pin of the VRM, and also connected to a memory controller hub (MCH) via the first induction coil; and
- a third terminal arranged to receive a system power; and a second transistor, comprising:
- a first terminal connected to the LGATE pin of the VRM to receive a second control signal from the LGATE pin of the VRM;
- a second terminal grounded; and
- a third terminal connected to the second terminal of the first transistor and the delay circuit;

wherein the VRM receives the PWM signal from the PWM controller; wherein the first control signal output from the UGATE pin of the VRM is at a high voltage level upon the condition that the PWM signal is at a high voltage level, and the first transistor is turned on; wherein the second control signal output from the LGATE pin of the VRM is at a high voltage level upon the condition that the PWM signal is at a low voltage level, and the second transistor is turned on; thereby the first transistor and the second transistor are turned on in alternating manner controlled by the VRM and the PHASE pin of the VRM provides a voltage signal for the MCH via the delay circuit and the first induction coil.

2. The power supply circuit of claim 1, wherein the first transistor and the second transistor are two N type metal oxide semiconductor (NMOS) transistors; wherein the first terminals are gates, the second terminals are sources, and the third terminals are drains.

3. The power supply circuit of claim 1, wherein the third terminal of the first transistor is arranged to receive the system power via a second induction coil.

4. The power supply circuit of claim 1, wherein the PWM controller comprises an external buffer PWM current protection signal (VTT_OPS) pin connected to the third terminal of the first transistor via a resistor.

5. The power supply circuit of claim 3, wherein the VRM further comprises an upper gate drive supply bias (PVCC) pin, a supply voltage (VCC) pin, an input PWM signal for controlling the driver (PWM) pin, and a GND pin; the PVCC and VCC pins of the VRM are both arranged to receive the system power, and grounded via a second capacitor; the PWM controller further comprises an external buffer PWM control output signal (VTT_PWM) pin, and the PWM pin of the VRM is connected to the VTT_PWM pin of the PWM controller; the GND pin of the VRM is grounded.

6. The power supply circuit of claim 1, wherein the first terminal of the first transistor is connected to the UGATE pin of the VRM via a resistor.

7. The power supply circuit of claim 1, wherein the first capacitor is connected to the BOOT pin of the VRM via a resistor.

8. The power supply circuit of claim 1, wherein the first terminal of the second transistor is connected the LGATE pin of the VRM via a resistor.

9. The power supply circuit of claim 1, wherein the third terminal of the first transistor is grounded via a second capacitor, a third capacitor, and a fourth capacitor separately.

10. The power supply circuit of claim 1, wherein the delay circuit comprises a resistor and a second capacitor, a first end of the resistor is connected the third terminal of the second transistor, and a second end of the resistor is grounded via the second capacitor.

11. The power supply circuit of claim 10, wherein resistance of the resistor ranges from about 2.09 ohms to 2.31 ohms.

12. The power supply circuit of claim 10, wherein the capacitance of the capacitor is about 1 nF.

* * * * *